(12) United States Patent
Oetlinger

(10) Patent No.: US 9,016,972 B2
(45) Date of Patent: Apr. 28, 2015

(54) MECHANICALLY INTERLOCKING FRAME ASSEMBLIES

(75) Inventor: Frank E. Oetlinger, Grafton, WI (US)

(73) Assignee: Blanking Systems, Inc., Grafton, WI (US)

( * ) Notice: Subject to any disclaimer, the term of this patent is extended or adjusted under 35 U.S.C. 154(b) by 636 days.

(21) Appl. No.: 13/273,988

(22) Filed: Oct. 14, 2011

(65) Prior Publication Data

US 2013/0091691 A1 Apr. 18, 2013

(51) Int. Cl.

| F16B 12/30 | (2006.01) |
|---|---|
| F16B 12/50 | (2006.01) |
| E04B 1/58 | (2006.01) |
| F16B 7/18 | (2006.01) |
| E04B 1/38 | (2006.01) |
| A47B 96/14 | (2006.01) |

(52) U.S. Cl.
CPC ............... *F16B 12/50* (2013.01); *F16B 12/30* (2013.01); *E04B 1/5831* (2013.01); *E04B 2001/405* (2013.01); *F16B 7/187* (2013.01); *A47B 96/1466* (2013.01)

(58) Field of Classification Search
USPC ................................. 403/252, 254, 255, 264
See application file for complete search history.

(56) References Cited

U.S. PATENT DOCUMENTS

| 3,066,773 | A | 12/1962 | Raidel |
|---|---|---|---|
| 3,456,413 | A | 7/1969 | Fischer |
| 3,901,612 | A | 8/1975 | Canin |
| 4,017,199 | A | 4/1977 | Strassle |
| 4,388,786 | A | 6/1983 | Gassler |
| D342,662 | S | 12/1993 | Lavin, Sr. |
| 5,337,641 | A | 8/1994 | Duginske |
| 5,443,554 | A | 8/1995 | Robert |
| 5,570,971 | A | 11/1996 | Rixen et al. |
| 5,622,012 | A | 4/1997 | Schijf |
| 5,671,580 | A | 9/1997 | Chou |
| 5,746,535 | A | 5/1998 | Kohler |
| 5,768,966 | A | 6/1998 | Duginske |
| 5,845,555 | A | 12/1998 | Dawley |
| 5,864,998 | A | 2/1999 | Loomer |
| 6,116,131 | A | 9/2000 | Fasske |
| 6,390,719 | B1 | 5/2002 | Chan |
| D471,083 | S | 3/2003 | Wall |
| 6,679,016 | B2 | 1/2004 | Liu |
| 6,708,858 | B2 | 3/2004 | Oetlinger |
| 6,712,254 | B2 | 3/2004 | Oetlinger |
| 6,712,543 | B1 | 3/2004 | Schmalzhofer |
| 6,715,953 | B2 | 4/2004 | Oetlinger et al. |

(Continued)

FOREIGN PATENT DOCUMENTS

| JP | 09-296815 | 11/1997 |
|---|---|---|
| JP | 2004-060789 | 2/2004 |

(Continued)

*Primary Examiner* — Victor MacArthur
(74) *Attorney, Agent, or Firm* — Boyle Fredrickson, S.C.

(57) ABSTRACT

A structural frame assembly is provided that includes mechanically interlocking components. The frame assembly has rails that interconnect with each other at joints that include brackets that engage the rails and nuts that are held in cavities of the rails that are connected to slots that extend through outer surfaces of the rails. Bolts may extend angularly through bores of the bracket and the slots of the rails to operatively engage a nut being held in the cavity. Tightening the bolts may draw the nut angularly through the cavity in a manner that automatically self-aligns the brackets and rails to establish precise joints.

20 Claims, 10 Drawing Sheets

(56) References Cited

U.S. PATENT DOCUMENTS

| | | |
|---|---|---|
| 6,722,811 B2 | 4/2004 | Oetlinger |
| D489,828 S | 5/2004 | Barnett |
| D490,295 S | 5/2004 | Neider et al. |
| 6,769,342 B2 | 8/2004 | Oetlinger |
| 6,796,474 B2 | 9/2004 | Oetlinger |
| 6,904,837 B2 | 6/2005 | Oetlinger |
| 6,942,132 B2 | 9/2005 | Oetlinger |
| 6,997,364 B2 | 2/2006 | Oetlinger |
| 7,143,916 B2 | 12/2006 | Oetlinger |
| 7,182,235 B2 | 2/2007 | Oetlinger |
| 7,185,797 B2 | 3/2007 | Oetlinger et al. |
| D628,539 S | 12/2010 | Tezak et al. |
| 7,992,752 B2 | 8/2011 | Oetlinger |
| D654,936 S | 2/2012 | Oetlinger |
| D655,021 S | 2/2012 | Oetlinger |
| 2003/0154838 A1* | 8/2003 | Oetlinger .................. 83/698.71 |
| 2003/0226869 A1 | 12/2003 | Oetlinger |
| 2003/0226872 A1* | 12/2003 | Oetlinger ..................... 225/104 |
| 2004/0050226 A1* | 3/2004 | Oetlinger .......................... 83/55 |
| 2004/0251294 A1* | 12/2004 | Oetlinger ....................... 225/97 |
| 2006/0133893 A1 | 6/2006 | Harashima et al. |
| 2007/0170221 A1* | 7/2007 | Oetlinger ..................... 225/104 |

FOREIGN PATENT DOCUMENTS

| | | |
|---|---|---|
| KR | 10-0215558 | 8/1999 |
| KR | 20-0236158 Y1 | 9/2001 |
| KR | 20-0372245 | 1/2005 |
| KR | 10-0725047 B1 | 6/2007 |
| KR | 10-2010-0016683 | 2/2010 |
| WO | 03070437 | 8/2003 |

* cited by examiner

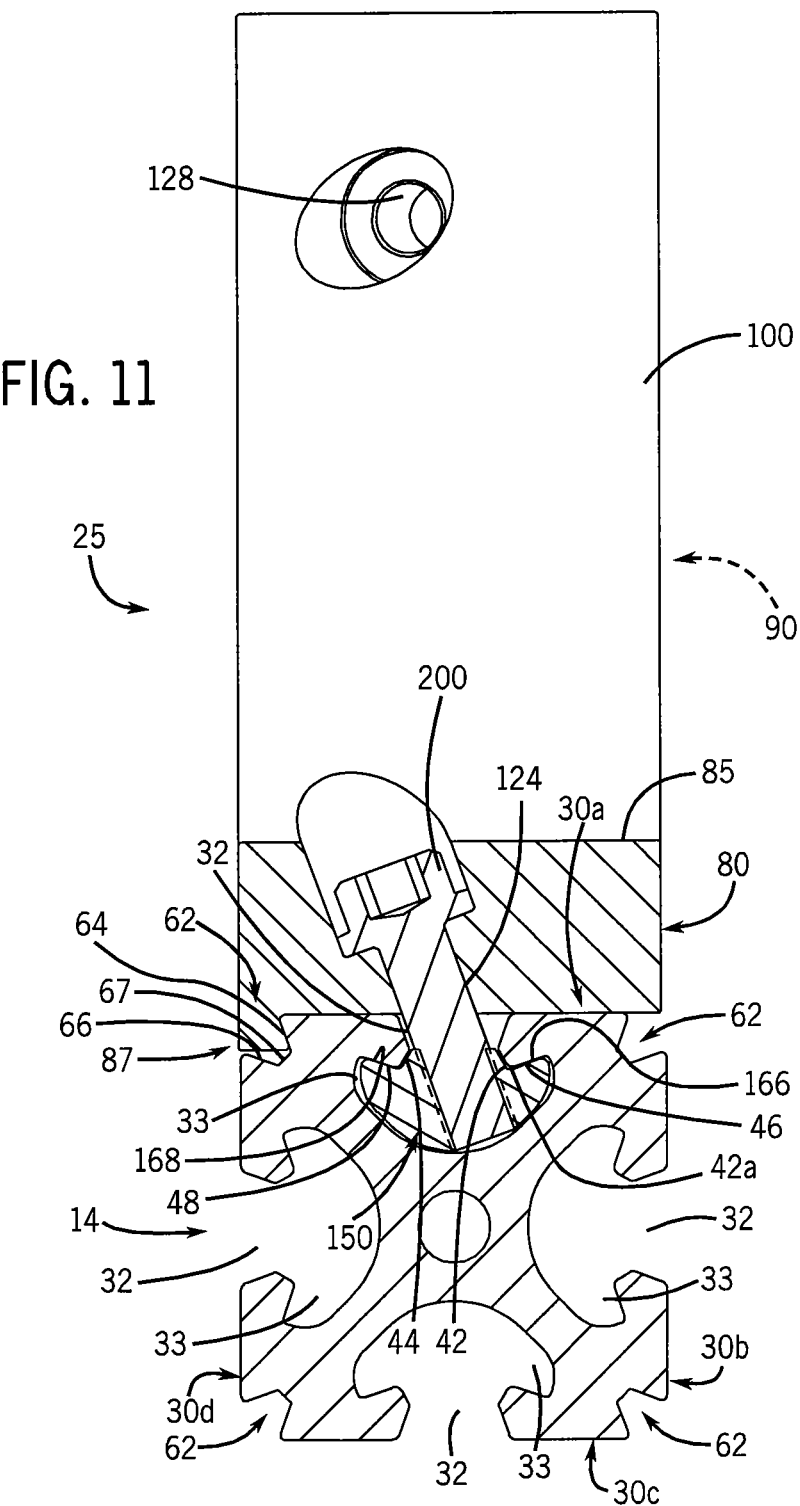

MECHANICALLY INTERLOCKING FRAME ASSEMBLIES

FIELD OF THE INVENTION

This invention relates generally to metallic frame assemblies that are used for making buildings, furniture, and/or other components and, in particular, to mechanically interlocking components such as brackets that may mechanically interlock rails or other modular frame components to each other.

BACKGROUND AND SUMMARY OF THE INVENTION

Structural frame assemblies that use extruded metallic or other rails as structural members are known and are widely used as supports or fixture components with automation equipment, as well as for furniture and building components. Such components, for example, rails, are typically held together at a joint with threaded fasteners that include bolts that extend orthogonally or in a normal direction with respect to rails and which are received into nuts, captured nuts, and/or threaded inserts, to make and maintain respective interconnections at the joint. However, bolts, captured nuts, and/or threaded inserts which rotate with respect to each other may loosen over time when the joint is subjected to vibration or loaded and unloaded during use.

The present inventor has recognized that in known frame assembly systems, assembly and aligning procedures can be frustrating because components at each joint can freely pivot or otherwise substantially move with respect to each other. The inventor has also recognized that such movement is typically created by pivotal movement of joint components about axes of pivotation that are defined by the fasteners that extend entirely orthogonally through the joint components and into rails. The inventor has recognized that movement of components at one joint is translated into movement of all other components that are connected directly or indirectly to the joint. The inventor has further recognized that when adjusting one corner in such a known system, the other corners or other components tend to become misadjusted and that this may make precision setups of such systems impractical or impossible. The present inventor has recognized that after a frame assembly is built, during use in some applications, joints tend to loosen so frequently that users may pin or weld the joints to try to increase the amount of time between adjusting of the frame assembly.

The present inventor also has recognized that in structural frame assemblies that use threaded fasteners to connect rails to each other, tightening the threaded fasteners may distort the rails. The present inventor has also recognized that when tightening threaded fasteners in rails that have longitudinally extending channels, the nuts, captured nuts, and/or threaded inserts engage portions of the rails that cause opposing sides of the rails to bend outwardly away from each other, distorting the rails by flaring out the rails at the joints.

The present inventor has further recognized that some joint looseness may be attributable to load-induced bolt elongation and/or thread wear of threaded fasteners, whereby, in joints having bolts that extend orthogonally or in a normal direction with respect to rails, the amount of looseness may correspond to the sizes of clearances that are created in the joints that correspond in size to the amount of elongation of the bolt or the amount of thread ware. The present inventor has recognized that joint looseness attributable to bolt elongation and thread wear may be relatively reduced by providing bolt assemblies having bolts that angularly or non-orthogonally intersect an interface defined by abutting surfaces of components being joined to each other at the joint. The present inventor has recognized that an amount of clearance that may be gained in a joint due to bolt elongation or thread wear may instead correspond to a vector component of such elongation or thread wear that aligns orthogonally or in a normal direction with respect to the interface between abutting surfaces of the components being joined to each other at the joint.

Therefore, it is a primary object and feature of the present invention to provide a structural frame assembly that has joints with mechanical interfaces that engage each other so that joint components mechanically align themselves while being tightened. This may provide a structural frame assembly that, during tightening of fasteners and without manual measuring and adjusting, automatically self-aligns with a relatively high amount of precision. This may also provide a structural frame assembly that can be precisely assembled, for example, with rails that lie precisely in common planes and rails that precisely intersect at 90°, or other angle(s) based on the particular configuration of a corner bracket being used, by merely tightening fasteners at joint locations. This may also provide a structural frame assembly with accuracy and precision of its end use dimensions being limited as a function of the accuracy and precision of the dimensions of the individual components of the structural frame assembly; and substantially not being limited by the skill of the assembler in accurately and precisely manually aligning the components. This may allow relatively less skilled assemblers to assemble highly precise structural frame assemblies and to do so relatively quickly. This automatic and self-aligning capability of the various components may also allow the joints of the structural frame assembly to restore to their precisely fitted positions or "return to zero" when the structural frame assembly enters a relaxed state after being subjected to loads and/or vibration. This may prevent the structural frame assembly from being skewed out of its precision setup position during use by absorbing loads primarily through, for example, bending of rails instead of face-to-face pivotal slip of components, about orthogonally extending fasteners, at joints. This may also allow the interfacing components of the joint assembly to further seat against each other during use while being subjected to loading, unloading, and vibrations, in preference to pivoting out of alignment, which may enhance or at least maintain the alignment integrity of the joint.

In accordance with another aspect of the present invention, a structural frame assembly is provided with joints that include brackets that may angularly accommodate bolts, non-orthogonally, with respect to abutting surfaces of a stack of components being joined to each other at the joint. This may provide a structural frame assembly that is highly rigid, resists fastener loosening, is relatively less susceptible to joint losing attributable to bolt elongation and thread wear, and has components that can be reused. This may allow the structural frame assembly to be used with automation equipment, for example, for incorporation into blanking stations or other uses for building blanking tools, that can be reconfigured and reused with a subsequent tool after a tool has been retired from service while providing precise component fitment and dimensional stability during use.

In accordance with another aspect of the present invention, a structural frame assembly is provided that includes a rail with a pair of abutment walls that are spaced from each other and extend angularly down and away from an outer surface of the rail, toward a middle portion of a cavity that extends longitudinally through the rail. A nut having a pair of shoulders and a pair of sidewalls that extend from the shoulders is held in the cavity. The shoulders of the nut may engage the abutment walls of the rail and at least one of the sidewalls of the nut may be spaced from the rail, defining a clearance therebetween. A bolt may extend angularly through the rail and operatively engage the nut so that rotating the bolt angularly advances or regresses the nut through the cavity. This may allow the shoulders of the nut to engage the abutment walls of the rail in multiple steps, by engaging one of the nut shoulders and a rail abutment wall adjacent the clearance between the nut sidewall and rail, allowing the nut to pivot within the cavity and about an edge defined at an end of the rail abutment wall so that the nut pivots until the second nut shoulder engages a second abutment wall at an opposing side of the cavity. The shoulders of the nut and the abutment walls of the rail may be angled so that further tightening of the bolt after the shoulders engage the rail abutment walls may draw the nut nearer to the outer surface of the rail and may also, by way of inwardly directed wedging action between interfacing surfaces of the shoulders and abutment walls, transversely compress the rail. This may allow tightening of a bolt to provide multi-axial tightening of the joint within the structural frame assembly by providing a clamping force in a direction that is normal to interfaces between various components to squeeze such components together within the joint and to transversely compress a rail at the joint location of the structural frame assembly.

BRIEF DESCRIPTION OF THE DRAWINGS

The drawings furnished herewith illustrate a preferred construction of the present invention in which the above advantages and features are clearly disclosed, as well as others which will be readily understood from the following description of the illustrated embodiment.

In the drawings:

FIG. 8 is a partially cross-sectional view of a joint the of the frame assembly of FIG. 1;

FIG. 11 a partially cross-sectional view of another variant of the joint of FIG. 9.

DETAILED DESCRIPTION OF THE DRAWINGS

Figure 1:
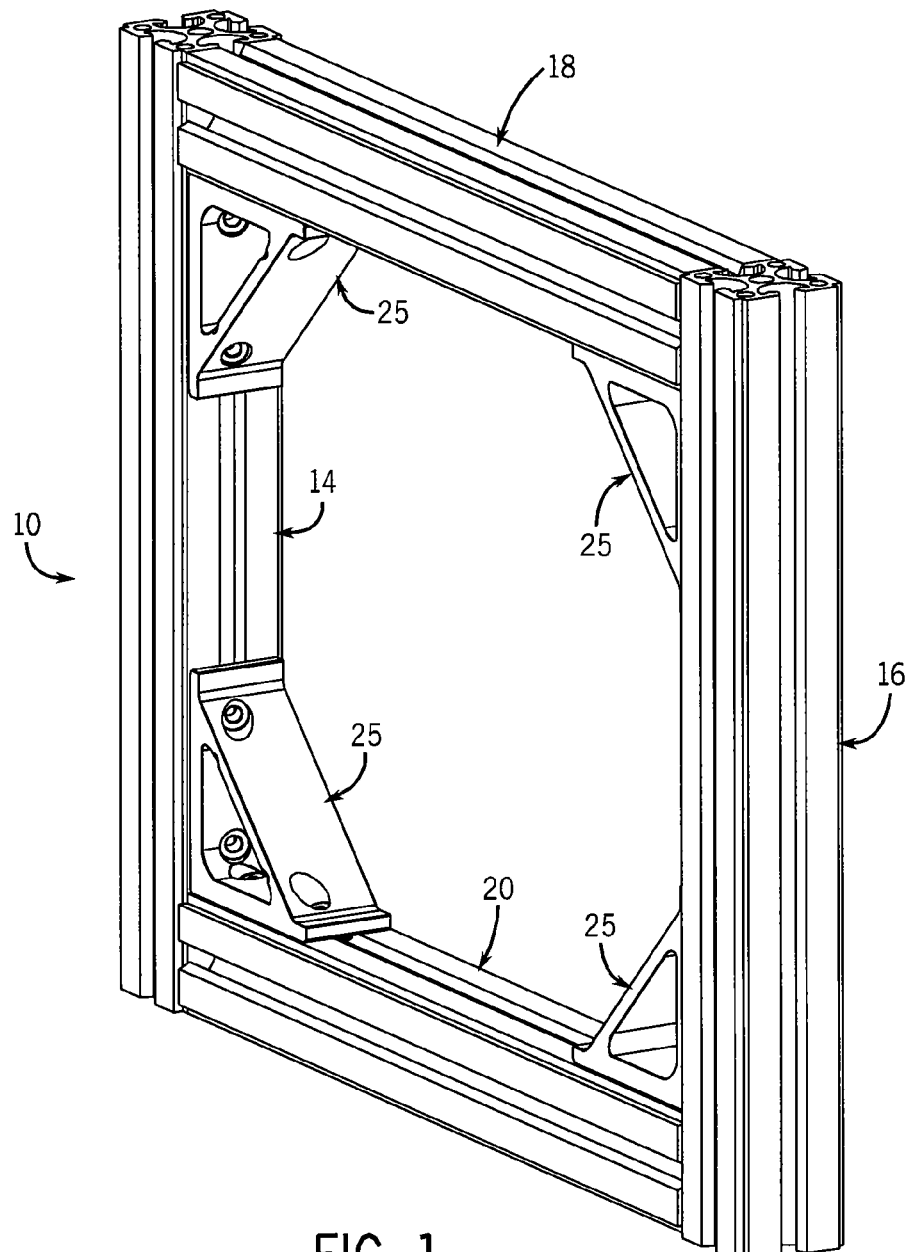
FIG. 1 is an isometric view from in front of and above a frame assembly in accordance with the present invention.

Referring to FIG. 1, a frame assembly constructed from components in accordance with the present invention is generally designated by the numeral 10. As hereinafter described, the components of the present invention may be used to construct frame assemblies of various configurations. As such, frame assembly 10 is merely exemplary of the type of frame assembly that may be constructed utilizing the components of the present invention. Other configurations of frame assembly 10 and multiple interconnected frame assemblies 10 that are usable as structural supports or fixture components for automation equipment, as well as for furniture and building components, are contemplated as being within the scope of the present invention.

Figure 2:
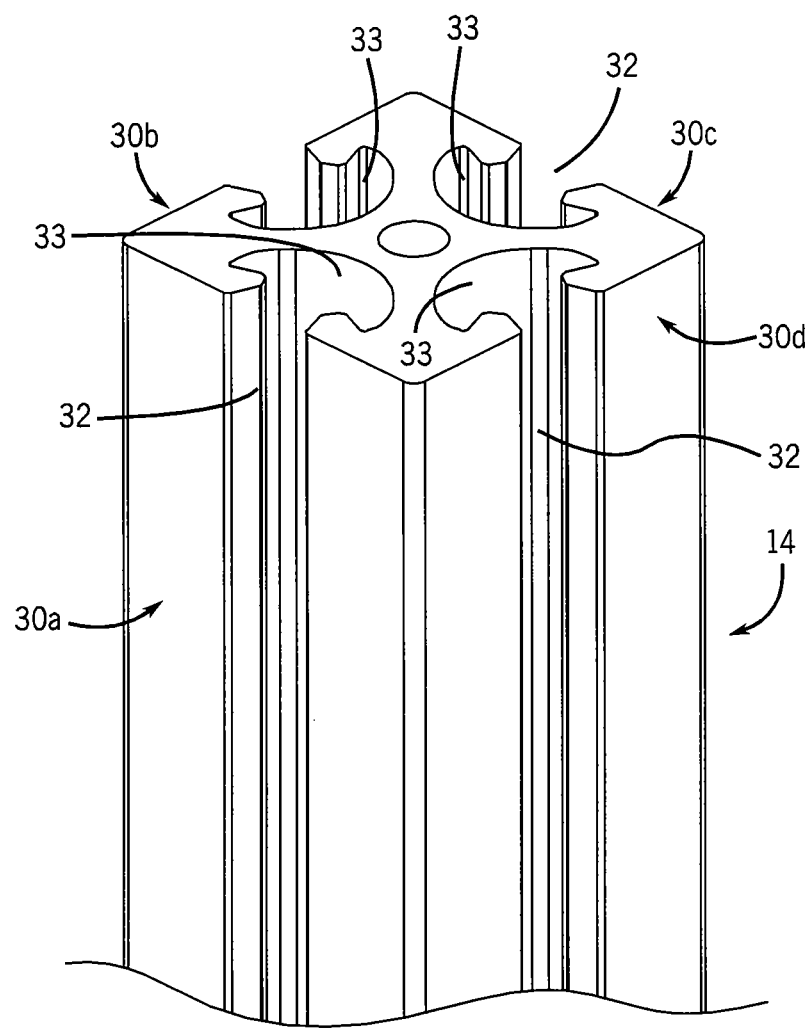
FIG. 2 is an isometric view from in front of and above a rail of the frame assembly of FIG. 1.

Frame assembly 10 includes first and second opposite, spaced apart longitudinally extending side frame members or rails 14 and 16, respectively, and spaced apart upper and lower frame members or rails 18 and 20, respectively. First frame rail 14 is rigidly interconnected at joints to upper and lower frame rails 18 and 20, respectively, by a pair of brackets shown as corner-engaging brackets 25. Similarly, second side frame rail 16 is rigidly interconnected at joints to upper and lower frame rails 18 and 20, respectively, by a pair of corner-engaging brackets 25. In the depicted embodiment, the frame rails 14, 16, 18, and 20 are identical in structure and, as such, the description hereinafter of frame rail 14 is understood to also describe the other frame rails 16, 18, and 20, as if fully described herein. Referring to FIGS. 1 and 2, frame rail 14 has a generally square configuration or cross-sectional profile shape and extends along a longitudinal axis. In alternate embodiments, the frame rails 14 may have different cross-sectional profile shapes, for example, round, rectangular, triangular, or some other polygonal shape (not illustrated), depending on the desired end-use configuration.

Figure 3:
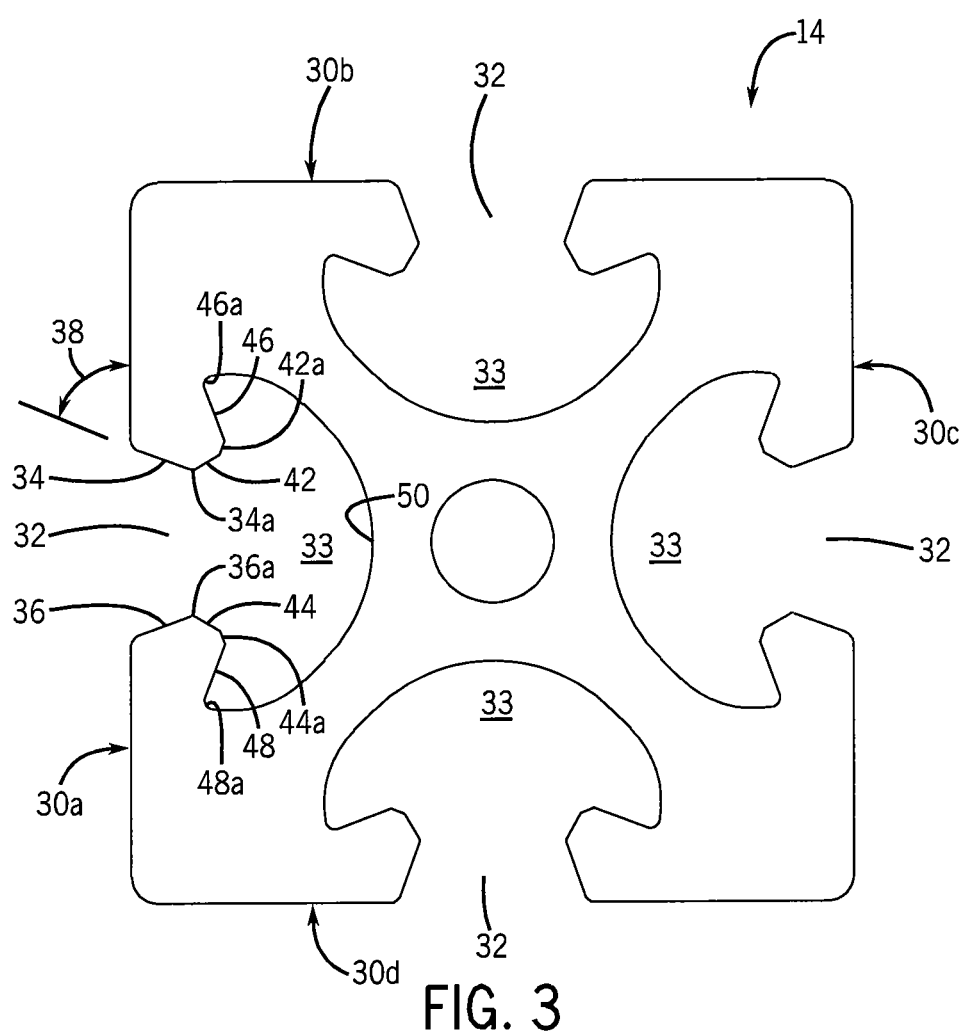
FIG. 3 is a top plan view of the rail of FIG. 2.

Referring to FIGS. 2 and 3, frame rail 14 has an outer surface that is defined by four faces 30*a*-30*d*. Each face 30*a*-30*d* is identical in structure and, as such, the description hereinafter of face 30*a* is understood to describe faces 30*b*-30*d*, as if fully described herein. Referring to FIG. 3, each face 30*a* of frame rail 14 is generally flat and includes slot 32 therein that extends along the entire length thereof and that opens into a longitudinally extending cavity 33. Slot 32 and cavity 33 are substantially symmetrical, whereby description of structures at one side of the slot 32 and/or cavity 33 are equally applicable to the corresponding structures on the other side of the slot 32 and/or cavity 33, only being mirror images thereof. Slot 32 is defined between first and second sidewalls 34 and 36, respectively, extending from face 30*a* at an angle 38 thereto. It is contemplated that angle 38 falls within the range of 1° and 89°, but is preferably between about 30° to about 80° and is most preferably about 70°. Correspondingly, in such a most preferred embodiment, each of the first and second sidewalls 34, 36 defines an angle of about 20° with respect to an imaginary line that extends through the centerline of the slot 32, whereby the first and second sidewalls 34, 36 define an angle of about 40° between each other. Slot 32 is further defined between first and second outer abutment walls 42 and 44, respectively, which diverge from corresponding terminal edges 34*a* and 36*a*, respectively, of first and second sidewalls 34 and 36, respectively. First abutment wall 42 angularly intersects first sidewall 34 to define an angle that is greater than 90° therebetween and second abutment wall 44 angularly intersects sidewall 36 to define an angle that is greater than 90° therebetween. Preferably an angle defined between the first abutment wall 42 and the first sidewall 34 is between about 110° to about 160° and is most preferably about 130°. From respective outermost portions, first and second inner abutment walls 46 and 48 define lines that extend angularly down and away from the face 30*a*, toward a middle portion of the cavity 33. Stated another way, from the inner lands 42*a* and 44*a* that connect the outer and inner abutment walls 42, 46 and 44, 48 to each other, respectively, the first and second inner abutment walls 42, 44 extend in opposing directions that diverge from each other and toward the face 30*a*. Each of the lands 42*a*, 44*a* defines a flat surface that extends between and connects the respective outer and inner abutment walls 42, 46 and 44, 48 to each other, defining an edge at each intersection of the lands 42a, 42a and outer and inner abutment walls 42, 46 and 44, 48. First and second outer abutment walls 42, 44 are at steeper angles or relatively closer to orthogonal with respect to the face 30a than are the inner abutment walls 46, 48 which are relatively closer to parallel with respect to the face 30a. The first and second outer abutment walls 42, 44 in one preferred embodiment define angles of about 60° with respect to the face 30a, whereas the inner abutment walls 46, 48 of this embodiment define angles of about 20° or 19° with respect to the face 30a. Concave terminal wall 50 extends between terminal edges 46a and 48a, respectively, of first and second inner abutment walls 46 and 48, respectively, and the cavity 33 is defined between the inner abutment walls 46, 48 and the concave terminal wall 50.

Figure 10:
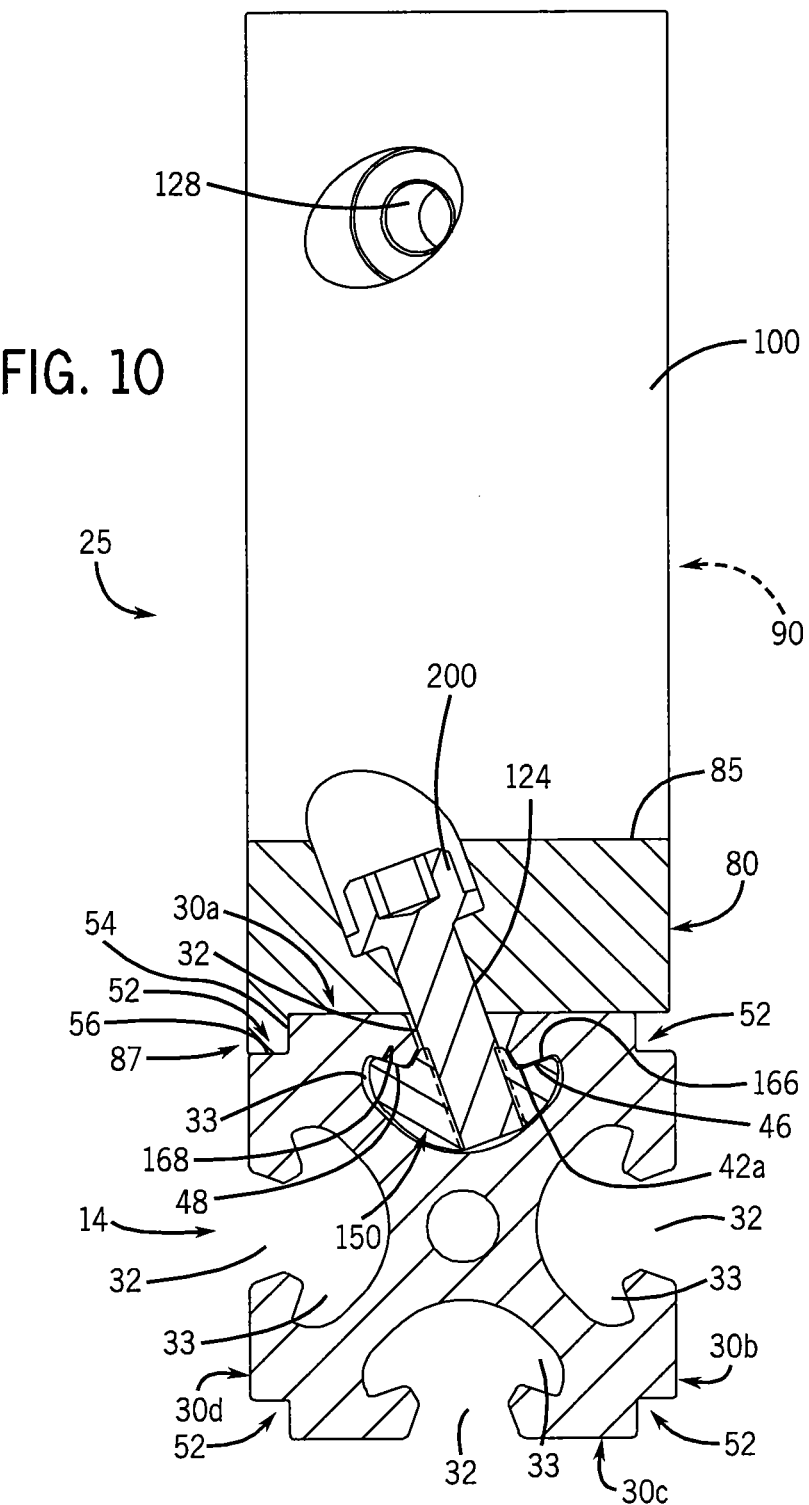
FIG. 10 a partially cross-sectional view of a variant of the joint of FIG. 9.

Referring now to FIG. 10 an alternate embodiment of frame rail 14 includes recesses 52 at the respective intersections of pairs of the faces 30a, 30b, 30c, 30d. The recesses 52 extend into and longitudinally along the frame rail 14. Each recess 52 is defined by recess sidewalls 54, 56 that perpendicularly intersect each other. Referring now to FIG. 11, this alternate embodiment of frame rail 14 includes recesses 62 at the respective intersections of pairs of the faces 30a, 30b, 30c, 30d and, like recesses 52, recesses 62 extend into and longitudinally along the frame rail 14. Each recess 62 is defined by recess walls 64, 66 that extend angularly into the frame rail 14 and intersect with opposing sides of a recess bottom wall 67.

Figure 4:
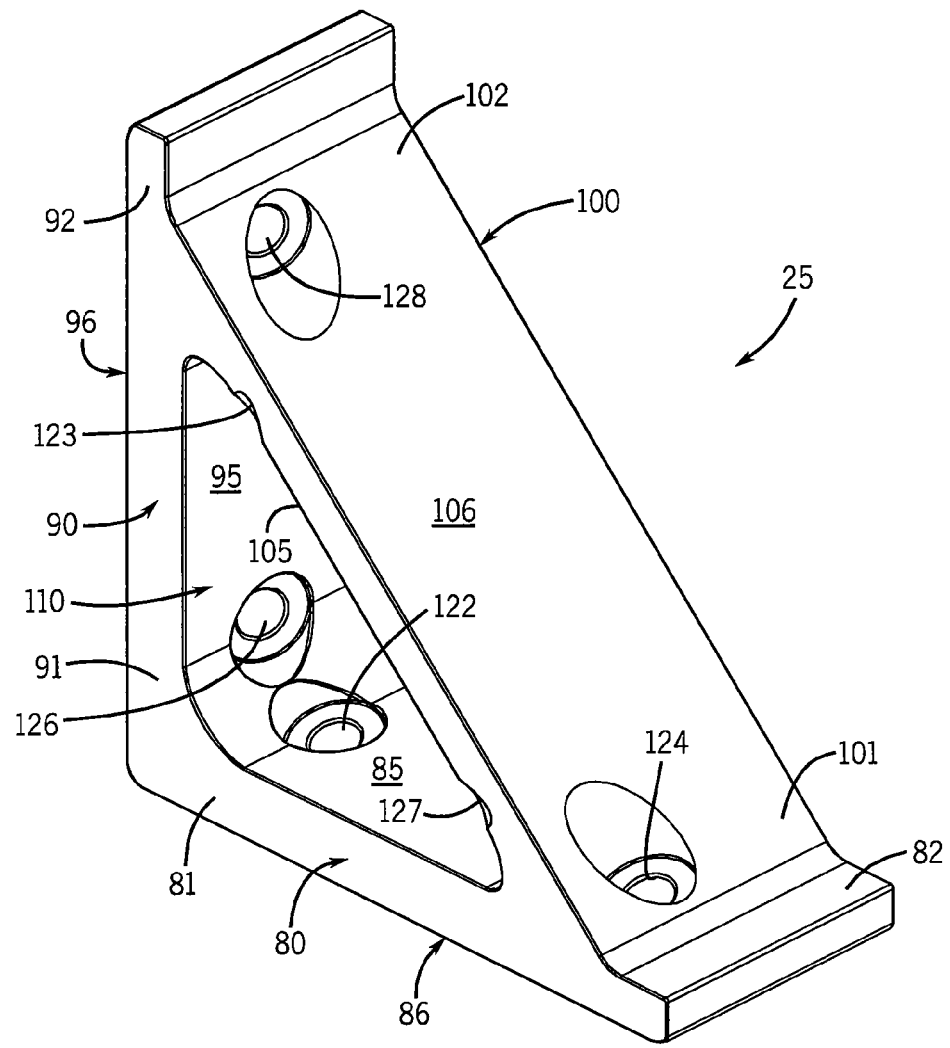
FIG. 4 is an isometric view from in front of and above a bracket of the frame assembly of FIG. 1.
Figure 5:
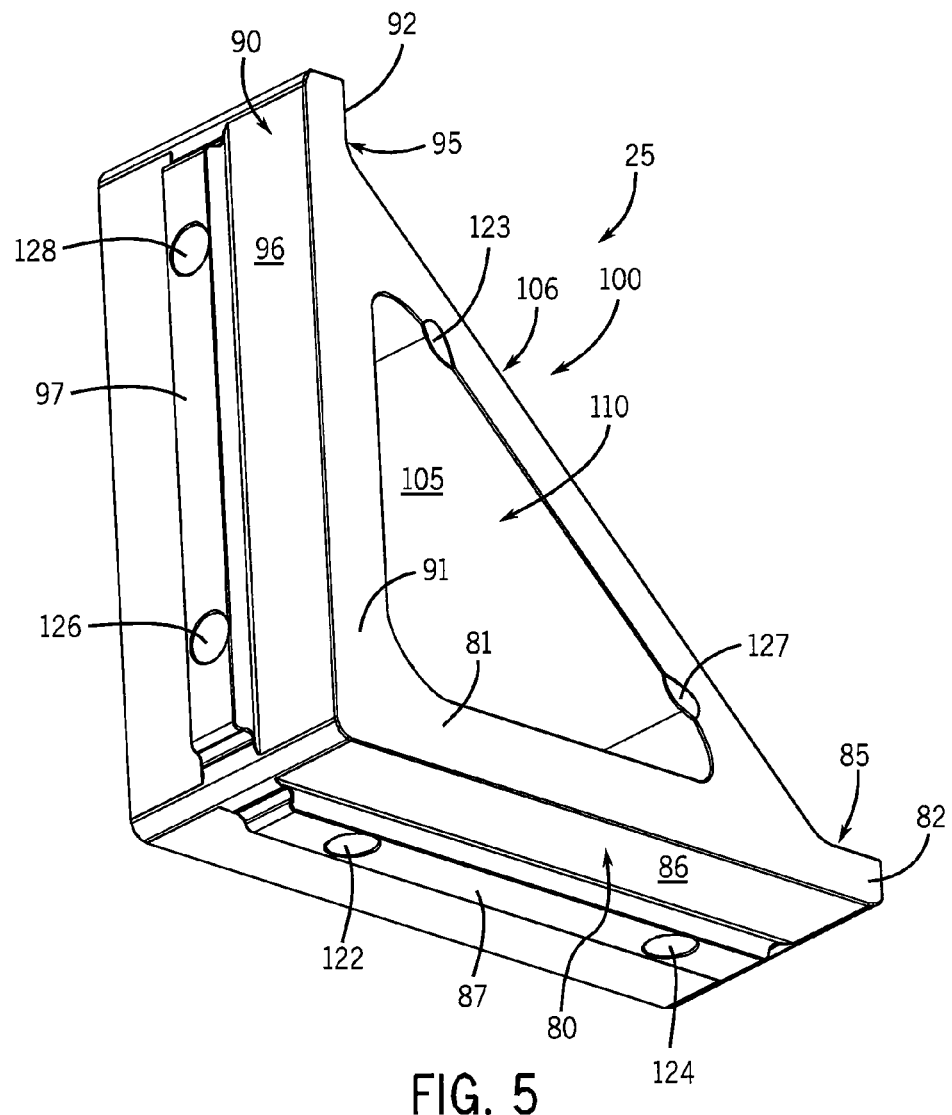
FIG. 5 is an isometric view from in back of and behind the bracket of FIG. 4.
Figure 9:
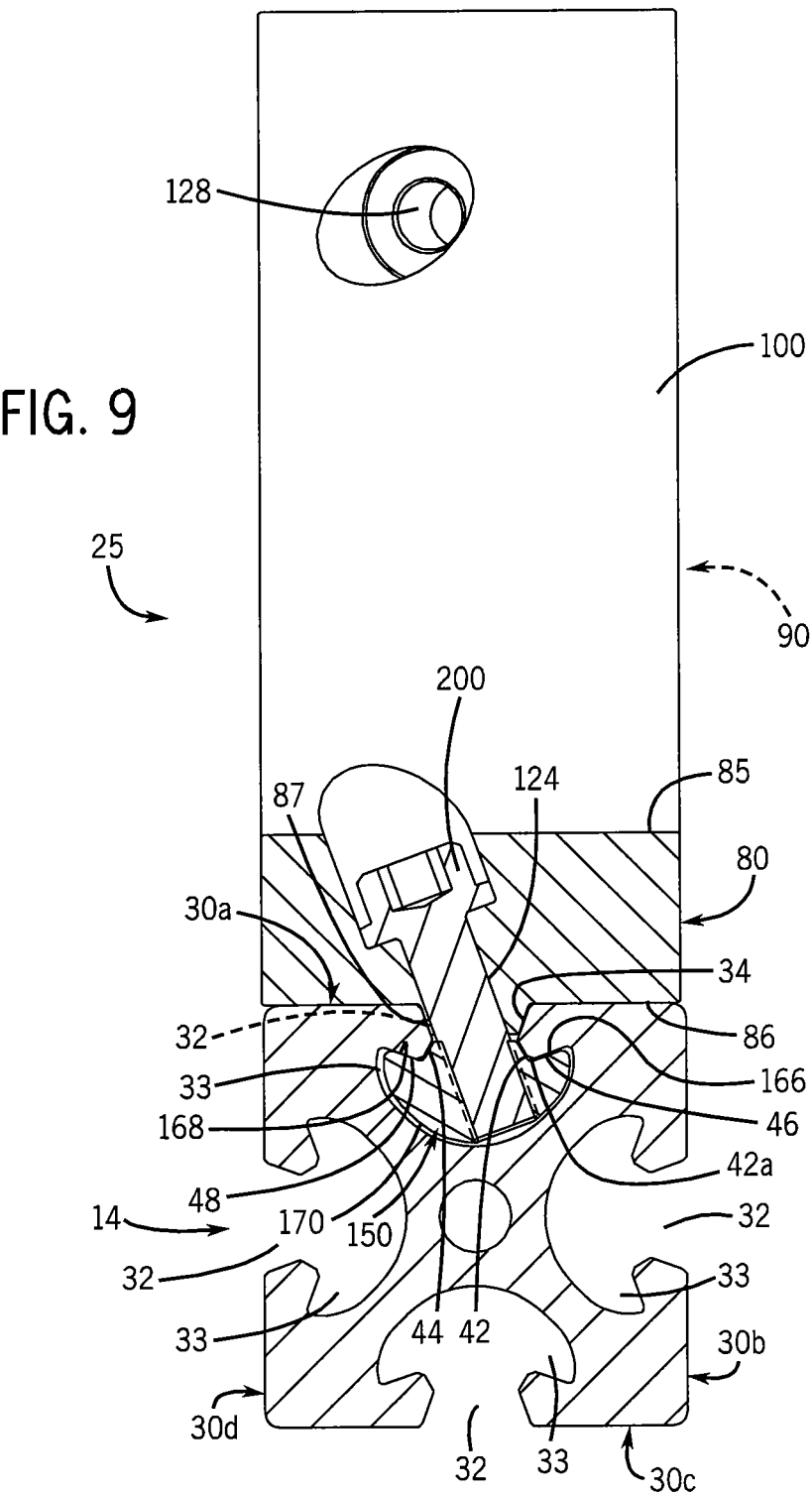

Referring to FIGS. 4 and 5, brackets 25 interconnect ends of respective ones of the rails 14, 16, 18, 20 to each other. Each bracket 25 defines a substantially triangular perimeter shape when viewed from a side elevation. Bracket 25 includes an L-shaped body defined by orthogonally intersecting first and second legs 80, 90 and a brace 100 that extends angularly between the first and second legs 80 and 90. First leg 80 includes inward and outward ends 81, 82 and substantially flat opposing inner and outer surfaces 85, 86. A bracket rail 87 extends outwardly from the outer surface 86 in a longitudinal direction and along an intermediate or middle segment of the first leg 80. Bracket rail 87 (FIG. 5) has a perimeter shape that corresponds to the perimeter shape of the portion of slot 32 that is defined between the first and second slot sidewalls 34 and 36 (FIG. 9). This allows the bracket rail 87 to nest into the slot 32, between the slot sidewalls 34, 36. Second leg 90 includes inward and outward ends 91, 92 and substantially flat opposing inner and outer surfaces 95, 96. A bracket rail 97 (FIG. 5) extends outwardly from the outer surface 96 in a longitudinal direction and along an intermediate or middle segment of the second leg 90. Bracket rail 97 is identical to bracket rail 87, whereby the description of bracket rail 87 is applicable here with respect to bracket rail 97.

Still referring to FIGS. 4 and 5, brace 100 has a first end 101 that connects to the outward end 82 of first leg 80 and a second end 102 that connects to the outward end 92 of second leg 90. Brace 100 includes substantially flat opposing inner and outer surfaces 105, 106. The inner surfaces 85, 95 and 105 of the first and second legs 80, 90 and brace 100, in combination, define an outer periphery of a triangular opening 110 that extends transversely through the bracket 25.

Bracket 25 includes two pairs of bolt-receiving bores 122, 124, and 126, 128 that extend angularly, in a transverse direction, through the first and second legs 80 and 90, respectively. Bores 122 and 124 of the first leg 80 extend parallel to the second leg 90 and angularly with respect to a plane extending from a centerline of the first leg 80, orthogonally through the inner and outer surfaces 85, 86 of the first leg 80. In this way, the bores 122, 124 of the first leg 80 define lower openings at an outer surface of the bracket rail 87 such that the lower openings of the bores 122, 124 are substantially aligned with a centerline of the first leg 80. Bore 122 defines an upper opening and counter bore that can receive a bolt head and is recessed into the inner surface 85 at the inward end 81 of the first leg 80. Bore 122 aligns with a groove 123 that extends into a side of the brace 100 adjacent the outward end 92 of the second leg 90. Groove 123 is positioned with respect to the bore 122 so that a bolt can be inserted into the bore 122 through the triangular opening 110 and a shaft of a tool (not shown) that tightens or loosens such bolt can nest into the groove 123 and drive the bolt through the bore 122, parallel to the second leg 90 and transversely angled with respect to the first leg 80. Bore 124 of the first leg 80 defines an upper opening and counter bore that can receive a bolt head and is recessed into the outer surface 106 at the first end 101 of the brace 100.

Still referring to FIGS. 4 and 5, bores 126 and 128 of the second leg 90 extend parallel to the first leg 80 and angularly with respect to a plane extending from a centerline of the second leg 90, orthogonally through the inner and outer surfaces 95, 96 of the second leg 90. In this way, the bores 126, 128 of the second leg 90 define lower openings at an outer surface of the bracket rail 97 such that the lower openings of the bores 124, 126 are substantially aligned with a centerline of the second leg 90. Bore 126 defines an upper opening and counter bore that can receive a bolt head and is recessed into the inner surface 95 at the inward end 91 of the second leg 90. Bore 126 aligns with a groove 127 that extends into a side of the brace 100 adjacent the outward end 82 of the first leg 80. Groove 127 is positioned with respect to the bore 126 so that a bolt can be inserted into the bore 126 through the triangular opening 110 and a shaft of a tool (not shown) that tightens or loosens such bolt can nest into the groove 127 and drive the bolt through the bore 126, parallel to the first leg 80 and transversely angled with respect to the second leg 90. Bore 128 of the second leg 90 defines an upper opening and counter bore that can receive a bolt head and is recessed into the outer surface 106 at the second end 102 of the brace 100.

It is preferred that the angles at which the bores 122, 124, and 126, 128 extend transversely through the first and second legs 80, 90 are acute angles with respect to the corresponding outer surfaces 86 and 96 of the first and second legs 80 and 90. Each of such acute angles falls in the range of 1° and 89°, but preferably between about 30° and about 80°, and is most preferably about 70° but, regardless, is selected to align with a corresponding bore of a nut 150 which is described in greater detail below.

Figure 6:
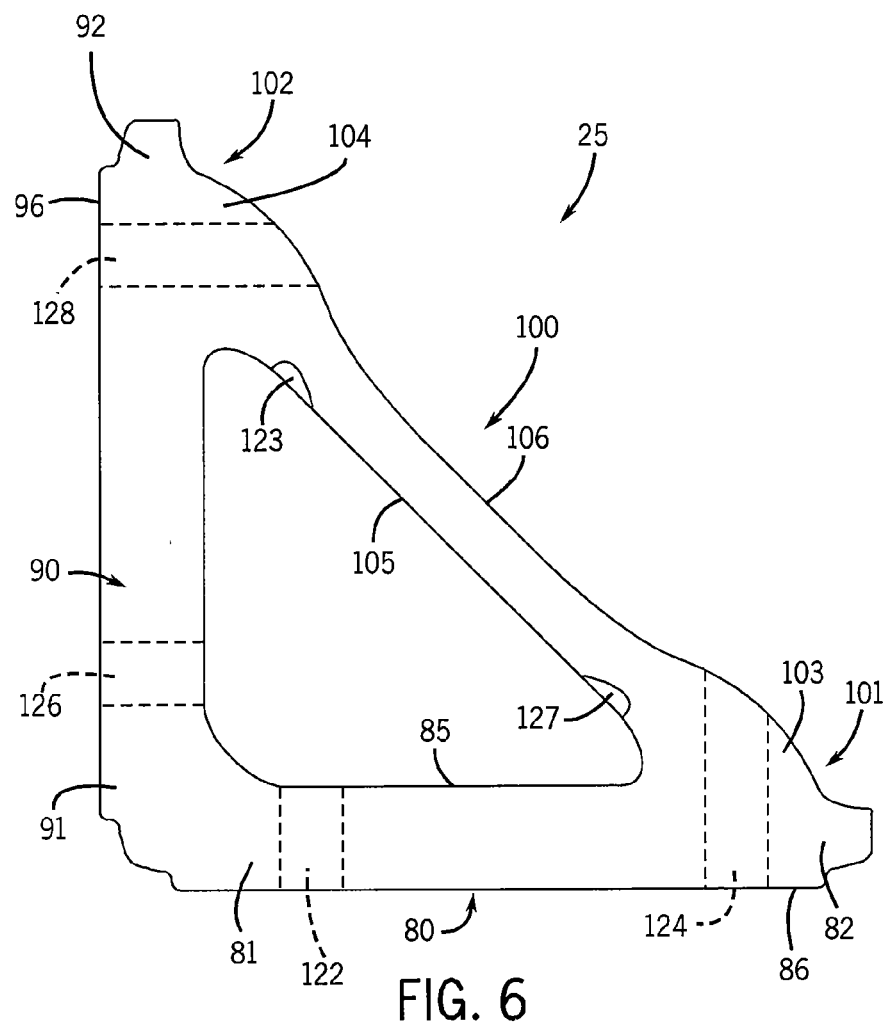
FIG. 6 is a side elevation view of a variant of the bracket of FIG. 4.

In an alternative embodiment shown in FIG. 6, the brace 100 includes a reinforcement 103, 104 at each of the first and second ends 101, 102. Each reinforcement 103, 104 in this embodiment includes and extra layer attached to or a thickening of the material of the first and second ends 101, 102 of the brace 100. The reinforcement 103, 104 overlies the intersections of the first and second ends 101, 102 with the legs 80, 90 of the bracket 25. In this particular embodiment, each reinforcement 103, 104 varies in thickness along its length, providing a curved outer surface and an arching sectional profile shape that tapers downwardly toward relatively thinner opposing ends from a relatively thicker middle segment.

In alternate embodiments shown in FIGS. 10 and 11, the bores 122, 124, 126, and 128 have lower openings at the outer surface 86, 96 of the first and second legs 80, 90 instead of at the bracket rail 87, 97 because each bracket rail 87, 97 is positioned adjacent a side edge of the outer surfaces 86, 96 instead of along a centerline of the legs 80, 90 as previously described. In the embodiment of FIG. 9, each bracket rail 87, 97 (only bracket rail 87 being shown) has a perimeter shape that corresponds to the perimeter shape of the recess 52, such that the bracket rail 87, 97 engages both the recess sidewalls 54, 56 of the recess. In the embodiment of FIG. 10, each bracket rail 87, 97 (only bracket rail 87 being shown) is configured to extend into recess 62 and engage the entire recess wall 64 in a dovetail-like manner.

Referring now to FIGS. 9-11, regardless of the particular configuration of the bracket rails 87, 97, the bracket rails 87, 97 provide mechanical interfaces that resist transverse sliding between interconnected components of the joints and which properly align the rails 14, 16, 18, 20, the brackets 25, and nuts 150 so that bolts 200 can extend through the bores 122, 124, and 126, 128 and engage corresponding nuts 150. Nuts 150 are provided within terminal ends of the cavities 33 so that the nuts 150 are accessible through the slots 32 in first face 30a of rail 14 by bolts 200 so as to rigidly connect the bracket 25 to the rail 14. The nuts 150 are sized to slide longitudinally through the cavities 33 and are captured within the cavities so that the nuts 150 do not rotate in unison with rotation of the bolts 200.

Figure 7:
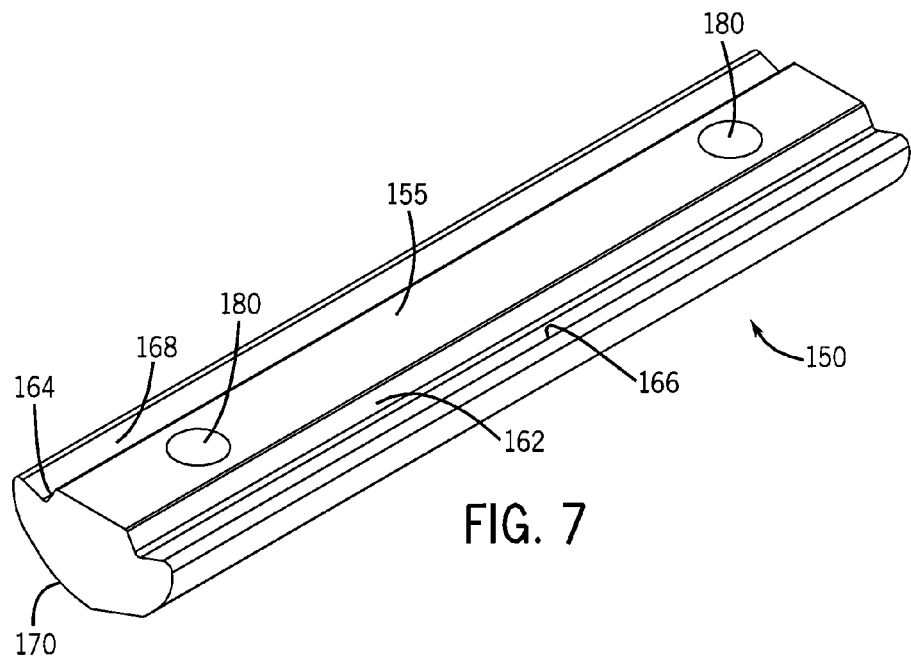
FIG. 7 is an isometric view from in front of and above a nut of the frame assembly of FIG. 1.
Figure 8:
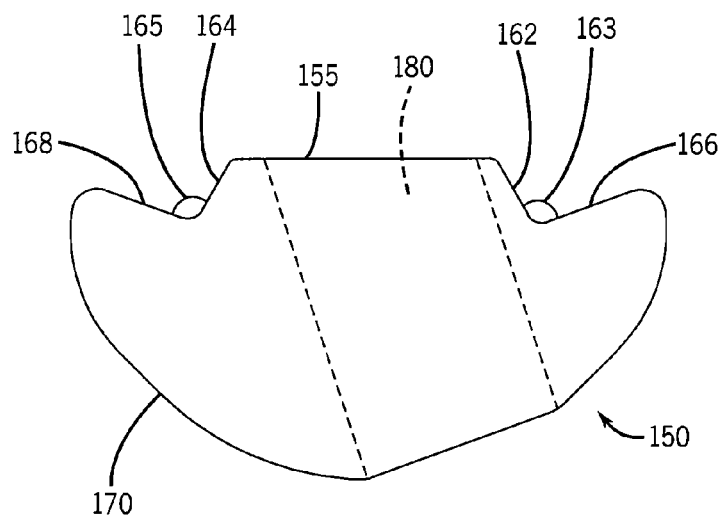
FIG. 8 is a front elevation view of the nut of FIG. 7.

Referring now to FIGS. 7 and 8, each nut 150 has a substantially planar upper wall 155 and a pair of outwardly tapering sidewalls 162, 164. As shown in FIGS. 9-11, the tapering sidewalls 162, 164 extend angularly from the upper wall 155 at angles that correspond to the angles of outer abutment walls 42 and 44 between which the lower portion of the slot 32 is defined in rail 14. A distance between the tapering sidewalls 162, 164 is smaller than a distance between the outer abutment walls 42, 44 so that, during use, a clearance is defined between the tapering sidewall 162 and outer abutment wall 42 in a manner that is described in more detail elsewhere herein. Referring again to FIGS. 7 and 8, a pair of shoulders 166, 168 extends outwardly from lower portions of the tapering sidewalls 162, 164 and upwardly in a direction of the upper wall 155.

Referring now to FIGS. 8-11, the shoulders 166, 168 of nut 150 extend at angles 163, 165 (FIG. 8) that generally correspond to the angles defined between inner abutment walls 46, 48 and outer abutments walls 42, 44 (FIG. 9) of the rail 14. It is preferred that angles 163 are obtuse angles, falling in the range of 91° and 179°, but preferably between about 95° and 105°, and is more preferably about 100°. Angles (not labeled) between shoulder 166 and a longitudinal axis of the bore 180, and between shoulder 168 and a longitudinal axis of the bore 180 are different. In the embodiment shown in FIG. 8, the angle between shoulder 166 and the longitudinal axis of bore 180 is about 90°, and the angle between shoulder 168 and the longitudinal axis of bore 180 is about 55°. A lower curved wall 170 extends along an arcuate path between and connects outer ends of the shoulders 166, 168. The profile shape and radius of curvature of the lower curved wall 170 of the nut 150 correspond to those characteristics of the concave terminal wall 50 that define the lower periphery of the cavity 33 of rail 14.

Referring again to FIGS. 7 and 8, nut 150 includes a pair of bores 180 that are spaced from each other along the length of the nut 150. The bores 180 extend orthogonally through the nut 150 in a longitudinal direction of the nut 150 and angularly in a transverse direction of the nut 150. Bores 180 extend at the same angles that the bores 122, 124, and 126, 128 extend through the first and second legs 80, 90, namely, transversely at acute angles. Each of such acute angles of bores 180 falls in the range of 1° and 89°, but is preferably between about 30° and about 80°, and is most preferably about 65° with respect to the upper wall 155 of the nut 150. In this configuration, each bore 180 has an upper opening that is substantially at a centerline of the nut 150 and a lower opening that is offset from the centerline of the nut, being positioned below the outwardly tapered sidewall 162.

Referring to FIG. 9, in order to interconnect a pair of the rails 14, 16, 18, and 20 to each other, for example, to interconnect rail 14 and 18, a bracket 25 and a pair of nuts 150 and bolts 200 are used. A first nut 150 is slid longitudinally into the cavity 33 of face 30a of rail 14. Bracket rail 87 of the first leg 80 of bracket 25 is slid into the slot 32 of the face 30a of rail 14. The first leg 80 of bracket 25 and nut 150 are slid lengthwise through the slot 32 and cavity 33 of rail 14 until the bracket 25 is in the desired position and the bores 122, 124 of the first leg 80 align with the pair of bores 180 of the nut 150. Bolts 200 are inserted through the unthreaded bores 122, 124 and are threaded into threads bores 180 of the nut 150.

Still referring to FIG. 9, tightening the bolts 200 into nut 150 provides multi-axial tightening to the joint in a manner that clamps the stack of the rail nut 150, rail 14, and bracket 25 together and transversely compresses the rail 14. Tightening each bolt 200 draws the nut 150 by advancing the nut 150 along the threads of the bolt 200. This pulls the nut 150 angularly up and across the cavity 33, toward the outer abutment wall 44 at the left-hand side (as illustrated) of the slot 32. The shoulder 166 engages the inner abutment wall 46 at the right-hand side (as illustrated) of cavity 33 while the nut 150 is being drawn angularly up and across the cavity 33, which establishes a clearance between the outer abutment wall 42 of the rail 14 and tapering sidewall 162. Such clearance provides enough space for the nut 150 to pivot within the cavity 33. This is done by further tightening the bolt 200 after the shoulder 166 engages the inner abutment wall 46 so that further advancing the nut 150 along bolt 200 pivots the nut 150 about the inner land 42a between the inner and outer abutment walls 46, 42. Nut 150 then pivots about the inner land 42a until the shoulder 168 engages the inner abutment wall 48 at the left-hand side (as illustrated) of cavity 33. When both shoulders 166, 168 of the nut 150 are engaging the inner abutment walls 46, 48 of the rail 14, further tightening of the bolt 200 moves nut 150 closer to the bracket 25. This urges the inner abutment walls 46, 48 closer to each other, transversely compressing the rail 14 because of the wedging action between the inner abutment walls 46, 48 and shoulders 166, 168 that slides the inner abutment walls 46, 48 across the shoulders 166, 168 and toward the tapering sidewalls 162, 164 of the nut 150. This also provides a clamping force that squeezes the rail 14 between the bracket 25 and nut 150 while tensioning the bolt 200.

To connect rail 18 to the bracket 25 and rail 14, bracket rail 97 of the second leg 90 of bracket 25 is slid into slot 32 of face 30a of rail 18. The procedure for tightening bolts 200 into a nut 150 to provide multi-axial tightening of the joint as described above is repeated so as to clamp the rail 18 between the bracket 25 and nut 150 and arrive at an assemblage of the bracket 25 and rails 14 and 18. Of course, the process may be repeated as many times as desired to interconnect the various brackets, rails, or other components with each other and make a frame assembly 10 which may then be used as a component or subassembly of a larger system or structure.

To make a frame assembly 10 with the alternate embodiments of rails 14, 16, 18, 20 and brackets 25 of FIGS. 10 and 11, the procedures are the same as those described above, only bracket rails 87, 97 are inserted into recesses 52 (FIG. 10) and/or 62 (FIG. 11) instead of slot 32.

Regardless of the particular configuration of the brackets 25, it is noted that profile shapes of the nuts 150, rails 14, slots 32, cavities 33, and brackets 25 are selected so that such components cooperate with each other in a manner that allows their respective mechanical interfaces that engage each other so that such joint components mechanically align themselves while being tightened. In preferred embodiments, this provides a frame assembly 10 that, during tightening of fasteners and without manual measuring and adjusting, automatically self-aligns with a relatively high amount of precision and that has a tendency to "return to zero" or realign at the joints during use, for example, when returning to a relaxed state after being loaded or vibrated.

Various modes of carrying out the invention are contemplated as being within the scope of the following claims particularly pointing out and distinctly claiming the subject matter, which is regarded as the invention. For example, although bracket 25 has been described as being an interior mounted bracket, it is contemplated that the bracket 25 may be configured as an exterior mounted bracket by providing the rail engaging structures of the bracket 25 on opposite sides of the first and second legs 80, 90. It is also contemplated that the bracket 25 may be flat with the first and second legs 80, 90 being orthogonally intersected and coplanar with each other that all of the bolts 200 extend in a common direction. The bracket may also be configured with a single leg 80, 90 or with the legs 80, 90 longitudinally aligned with each other so that the bracket 25 can splice longitudinally aligned rails 14, 16, 18, 20 with each other.

The invention claimed is:

1. A structural frame assembly comprising:
    a rail having an outer surface, defining a longitudinal axis, and having a slot that extends parallel to the longitudinal axis, and a cavity that extends parallel to the longitudinal axis and connects to the slot;
    a nut that is housed in the cavity;
    a structural element engageable with the outer surface of the rail, the structural element having a passageway extending therethrough at a non-orthogonal angle; and
    a bolt that extends angularly through the passageway in the structural element and into the slot in the rail, the bolt engageable with the nut so that rotating the bolt moves the nut angularly through the cavity;
    wherein the rail further includes an outer abutment wall that defines at least a portion of a periphery the slot and an inner abutment wall that is connected to the outer abutment wall and that defines at least a portion of a periphery of the cavity, and an edge defined at a location of connection between the outer and inner abutment walls, the edge defining a pivot point about which the nut can pivot when the nut engages the edge while moving angularly through the cavity.

2. The frame assembly of claim 1, the rail further comprising a sidewall that extends between and connects the rail outer surface and the outer abutment wall.

3. The frame assembly of claim 1, the nut further comprising a top wall and a shoulder that extend in a transverse direction away from the top wall, the shoulder engaging the inner abutment wall of the rail.

4. The frame assembly of claim 3, the nut further comprising a sidewall that extends between the top wall and the shoulder, the sidewall of the nut being spaced from outer abutment wall of the rail.

5. A structural frame assembly, comprising:
    a rail having an outer surface, defining a longitudinal axis, and having a slot that extends parallel to the longitudinal axis, a cavity that extends parallel to the longitudinal axis and connects to the slot, and a pair of abutment walls that are spaced from each other and extend angularly down and away from the outer surface of the rail and toward a middle portion of the cavity; and
    a nut that includes a pair of shoulders and a pair of sidewalls that extend from the shoulders, the shoulders of the nut engaging the abutment walls of the rail and at least one of the pair of sidewalls of the nut being spaced from the rail
    a structural element engageable with the outer surface of the rail, the structural element having a passageway extending therethrough; and
    a bolt that extending through the passageway in the structural element and the rail and into the nut at a non-orthogonal angle with respect to at least one of the rail and the nut.

6. The structural frame assembly of claim 5, the nut further comprising an upper wall and the pair of sidewalls extending angularly between the upper wall and the pair of shoulders.

7. The structural frame assembly of claim 5, wherein the structural element includes a bracket, the bracket engaging an outer surface of the rail, and wherein the bolt extends through the bracket at a non-orthogonal angle.

8. The structural frame assembly of claim 5, wherein the structural element includes a bracket, the bracket having a first leg and a second leg that intersect each and are positioned substantially orthogonally with respect to each other.

9. The structural frame assembly of claim 5, wherein the structural element includes a bracket, the bracket having a brace that extends between and connects outward ends of the first leg and second leg to each other.

10. The structural frame assembly of claim 9, wherein the brace of the bracket includes a groove that can accommodate a shaft of a tool and that is aligned with the bolt.

11. A structural frame assembly, comprising:
    a rail including a first abutment wall and a second abutment wall arranged at an angle with respect to each other, the first and second abutment walls having surfaces defining at least a portion of an outer periphery of a cavity extending longitudinally through the rail;
    a nut receivable in the cavity of the rail at a position and including a shoulder and a sidewall arranged at an obtuse angle with respect to each other of less than 180°, the position of the nut being selectively lockable;
    a structural element engageable with the rail, the structural element having a passageway extending therethrough;
    a bolt extendable through the passageway in the structural element and the rail and into the nut; and
    wherein the nut is configured such that tightening of the nut on the bolt pivots the nut in the cavity of the rail and draws the shoulder and sidewall of the nut into engagement with the surfaces of the first and second abutment walls of the rail to selectively lock the position of the nut with respect to the rail.

12. The structural frame assembly of claim 11, wherein the shoulder and the sidewall of the nut face away from the cavity of the rail when the nut is received in the cavity of the rail.

13. The structural frame assembly of claim 11, wherein an angle is defined between the surfaces of the first and second abutment walls of the rail corresponds to the angle defined between the shoulder and sidewall of the nut.

14. The structural frame assembly of claim 11, wherein a bore extends at an angle through the nut for receiving the bolt, the bolt arranged to rotate for tightening the nut by drawing the sidewall and shoulder of the nut into engagement with the surfaces of the first and second abutment walls.

15. The structural frame assembly of claim 11, wherein the first and second abutment walls define a first pair of abutment walls arranged at a first side of the rail and a second pair of abutment walls is arranged at a second side of the rail, wherein the shoulder and sidewall of the nut define a first shoulder and sidewall arranged at a first side of the nut and a second shoulder and sidewall are arranged at a second side of the nut, and wherein the second shoulder and sidewall are arranged at an angle of less than 180° with respect to each other and are configured for engaging surfaces of the second pair of abutment walls of the rail.

16. A structural frame assembly comprising:
a rail defining first and second side segments and having an outer surface, a slot extending generally perpendicularly through the outer surface, and a cavity connected to and arranged inwardly of the slot and extending transversely beyond the slot in opposing directions such that the cavity defines first and second side segments arranged at the first and second side segments of the rail, wherein at least one of the first and second side segments of the rail includes inner surfaces interconnected with each other and facing toward the cavity at a respective at least one of the first and second side segments of the cavity;
a structural element engageable with the rail, the structural element having a passageway extending therethrough;
a bolt extendable through the passageway in the structural element and the rail; and
a nut receivable in the cavity of the rail at a position and being selectively locked by the bolt in the position, wherein the nut is configured to receive the bolt at an angle relative to the nut such that the bolt extends angularly with respect to the cavity and the slot, the nut defining first and second side segments arranged within the first and second side segments of the cavity of the rail, respectively; and
wherein at least one of the first and second side segments of the nut includes outer surfaces interconnected with each other and engaging the inner surfaces of the rail at the at least one of the first and second side segments of the rail when the nut is locked by tightening of the nut on the bolt to draw the nut toward the rail at an angle within the cavity that corresponds to the angle of the bolt relative to the nut and to pivot nut in the cavity.

17. The structural frame assembly of claim 16, wherein the inner surfaces of the rail define two surfaces arranged in two planes that intersect each other to define an angle of less than 180°.

18. The structural frame assembly of claim 17, wherein the outer surfaces of the nut define two surfaces arranged in two planes that intersect each other to define an angle of less than 180°.

19. The structural frame assembly of claim 16, wherein at each of the first and second sides of the rail, the inner surfaces of the rail define two surfaces arranged in two planes that intersect each other to define an angle of less than 180°.

20. The structural frame assembly of claim 19, wherein at each of the first and second sides of the nut, the outer surfaces of the nut define two surfaces arranged in two planes that intersect each other to define an angle of less than 180°.

* * * * *